United States Patent
Agarwal

(10) Patent No.: US 11,481,136 B1
(45) Date of Patent: Oct. 25, 2022

(54) VERY LOW SIZED ZONE SUPPORT FOR STORAGE DEVICES

(71) Applicant: WESTERN DIGITAL TECHNOLOGIES, INC., San Jose, CA (US)

(72) Inventor: Dinesh Kumar Agarwal, Karnataka (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 17/230,753

(22) Filed: Apr. 14, 2021

(51) Int. Cl.
*G06F 12/00* (2006.01)
*G06F 3/06* (2006.01)

(52) U.S. Cl.
CPC .......... *G06F 3/0647* (2013.01); *G06F 3/0604* (2013.01); *G06F 3/064* (2013.01); *G06F 3/0644* (2013.01); *G06F 3/0659* (2013.01); *G06F 3/0673* (2013.01)

(58) Field of Classification Search
CPC ...... G06F 3/0604; G06F 3/064; G06F 3/0644; G06F 3/0659; G06F 3/0673
See application file for complete search history.

(56) References Cited

U.S. PATENT DOCUMENTS

| | | | |
|---|---|---|---|
| 8,244,960 B2 | 8/2012 | Paley et al. | |
| 8,949,568 B2 | 2/2015 | Wei et al. | |
| 9,092,340 B2 | 7/2015 | Sprouse et al. | |
| 9,235,530 B2 | 1/2016 | Wu et al. | |
| 2008/0109588 A1 | 5/2008 | Yun et al. | |
| 2012/0297121 A1 | 11/2012 | Gorobets et al. | |
| 2020/0159436 A1* | 5/2020 | Walker | G06F 3/0679 |
| 2021/0334041 A1* | 10/2021 | Bennett | G06F 3/0604 |
| 2021/0373809 A1* | 12/2021 | Benisty | G06F 3/0644 |
| 2022/0075559 A1* | 3/2022 | Balakrishnan | G06F 11/1076 |
| 2022/0113885 A1* | 4/2022 | Jeon | G06F 3/0602 |

* cited by examiner

*Primary Examiner* — John A Lane
(74) *Attorney, Agent, or Firm* — ArentFox Schiff LLP

(57) ABSTRACT

Aspects of a storage device including a memory and a controller are provided. The memory includes a first partition having multiple dies as channels that are allocated to one or more zones. The controller may receive a write command and data from a host device, in which the write command indicates to write the data to a first zone. The controller may perform a write operation that writes received data to one or more of the plurality of dies that are allocated to a first zone. The controller may transfer the data from the first zone to a second partition in the memory that is associated with the first zone, when the storage device and the host device are in idle states. Thus, the controller can reduce the amount of overprovisioning of memory block allocation to small-sized zones, thereby improving the memory capacity and utilization of the storage device.

20 Claims, 14 Drawing Sheets

VERY LOW SIZED ZONE SUPPORT FOR STORAGE DEVICES

BACKGROUND

Field

This disclosure is generally related to electronic devices and more particularly to storage devices.

INTRODUCTION

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

A flash storage device may store control information associated with data. For example, a flash storage device may maintain control tables that include a mapping of logical addresses to physical addresses. This control tables are used to track the physical location of logical sectors, or blocks, in the flash memory. The control tables are stored in the non-volatile memory to enable access to the stored data after a power cycle.

Zoned Namespace (ZNS) is an SSD namespace architecture in which the non-volatile memory is divided into fixed-sized groups of logical addresses, or zones. Each zone is used for a specific application. For example, the host may write data associated with different applications in different zones. Zones are spread across a single die, with each zone generally spanning 48 MB or 64 MB of size. The flash storage device interfaces with the host to obtain the defined zones, and maps the zones to blocks in the flash memory. Thus, the host may write separate application-related data into separate blocks of flash memory.

Traditionally, data in a flash storage device may be invalidated in small chunks (e.g. 4 KB of data), for example, when a host overwrites the data. To remove the invalidated data from the flash memory, the flash storage device performs a garbage collection (GC) process in which valid data may be copied to a new block and the invalidated data is erased from the old block. However, in ZNS, a zone is sequentially written before the data in the zone is invalidated, and thus the entire zone may be invalidated at once (e.g. 48 or 64 MB of data). This feature of ZNS reduces or eliminates GC, which in turn reduces write amplification. As a result, ZNS may optimize the endurance of the flash storage device, as well as improve the consistency of input/output (I/O) command latencies.

There may be specific ZNS architecture requirements for supporting very low zone sizes (e.g., 2 MB, 4 MB, 8 MB or similar sizes) for specific applications. With increasing block sizes in the arrays of NAND cells, support for very low zone sizes becomes increasingly challenging without wasting significant flash storage capacity and compromising on the storage device performance.

SUMMARY

One aspect of a storage device is disclosed herein. The storage device includes a memory and a controller. The memory includes a first partition having a plurality of dies as channels that is allocated to one or more zones. The controller is configured to perform a write operation that writes received data to one or more of the plurality of dies that are allocated to a first zone. The controller is also configured to transfer the data from the first zone to a second partition in the memory that is associated with the first zone when the storage device is in an idle state.

Another aspect of a storage device is disclosed herein. The storage device includes a memory and a controller. The memory includes a first partition having a plurality of dies as channels that is allocated to one or more zones. The controller is configured to receive a write command and data from a host device, the write command indicating to write the data to a first zone of the one or more zones. The controller is also configured to perform a write operation that writes the data to one or more of the plurality of dies that are allocated to the first zone. The controller is also configured to transfer the data from the first zone to a second partition in the memory that is associated with the first zone, when the storage device is in an idle state.

A further aspect of a storage device is disclosed herein. The storage device includes a memory and a controller. The memory includes a first partition having a plurality of dies as channels that is allocated to one or more zones, wherein each of the plurality of dies comprises a plurality of blocks. The controller is configured to allocate each of the plurality of blocks in each of the plurality of dies as a lowest level of erase unit to the one or more zones. The controller is also configured to receive a write command and data from a host device, the write command indicating to write the data to a first zone of the one or more zones. The controller is also configured to perform a write operation that writes the data to one or more of the plurality of dies that are allocated to the first zone. The controller is also configured to transfer the data from the first zone to a second partition in the memory that is associated with the first zone, when the storage device is in an idle state.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
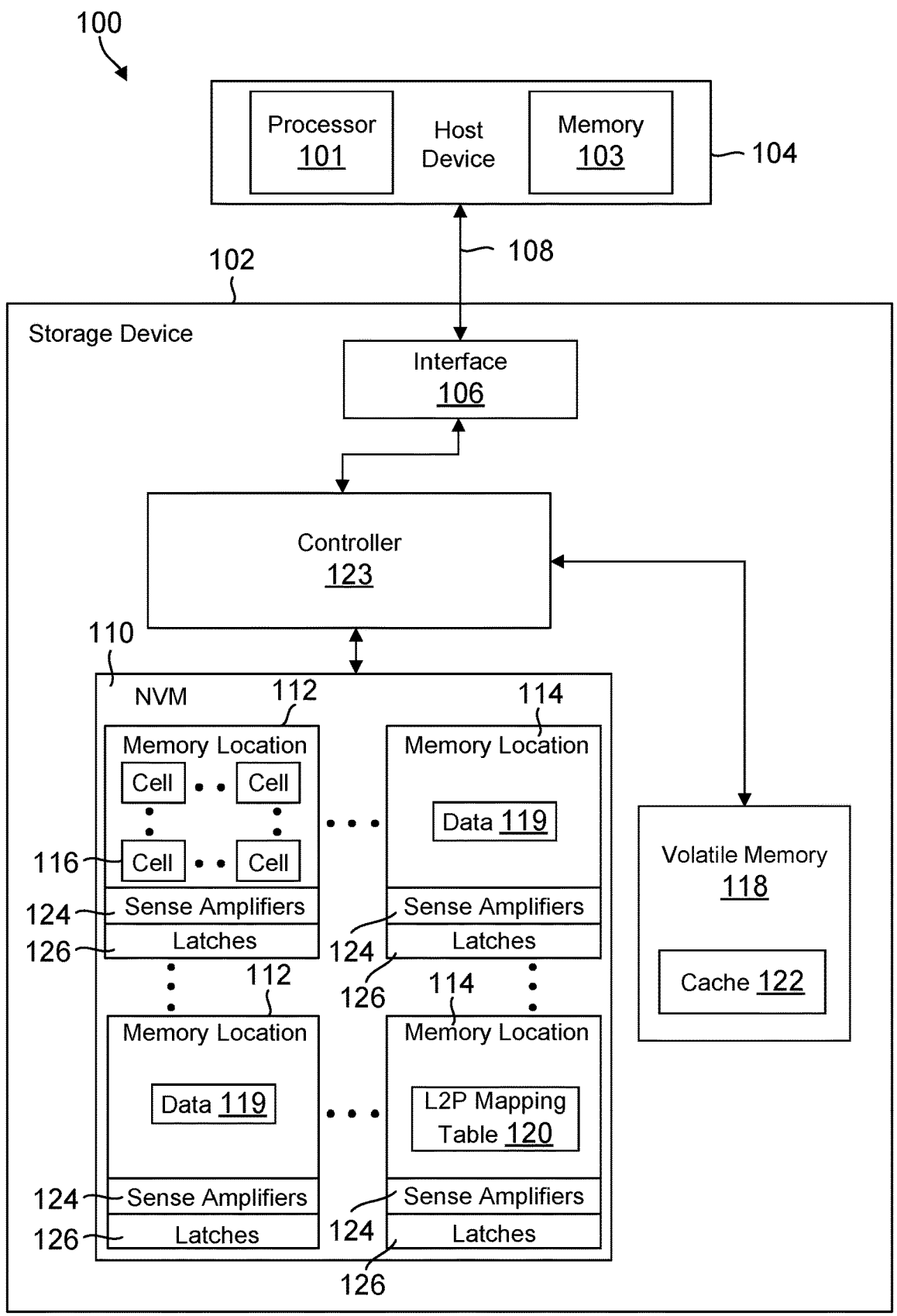
FIG. 1 is a block diagram illustrating an exemplary embodiment of a storage device in communication with a host device.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

Typically, in ZNS, a host provides a definition of zones, or groups of logical addresses, to a flash storage device. For example, the host may indicate that one group of LBAs corresponding to 48 or 64 MB of data are associated with a first zone, that another group of LBAs corresponding to another 48 or 64 MB of data are associated with a second zone, and so forth. The flash storage device then maps each zone to a single block in the flash memory. For instance, the flash storage device may map the LBAs associated with the first zone to a first physical block, the LBAs associated with the second zone to a second physical block, etc. This one-to-one mapping of each zone to a block allows for the reduction or elimination of GC by effectively making the zones independent. For example, after sequentially writing data to a block mapped to one zone, the host may invalidate that zone by instructing the flash storage device to erase that block only, without impacting the data in other zones/blocks.

However, there is a trending increase in physical block sizes (e.g. numbers of word lines and strings) as flash storage devices move towards subsequent generations. For example, BICs4 flash storage devices currently have 96 word lines in a block, BICs5 flash storage devices may have 112 word lines in a block, and BICs6 flash storage devices are expected to have even more word lines in a block. Nevertheless, although the flash storage device may support increasing physical block sizes, the host may not be able to support different zone sizes (i.e. zone sizes are fixed in ZNS). This may lead to unused storage space in each block and thus wasted storage capacity. For example, even if the capacity of each block increases from 64 MB to 128 MB in future generations, the host may still only be able to write at most 64 MB of data in a zone that is mapped to each block, resulting in the remaining 64 MB of each block being unused.

Furthermore, there may be specific ZNS architecture requirements for supporting significantly small zone sizes (e.g., 2 MB, 4 MB, 8 MB or similar sizes) for specific applications. With increasing block sizes in the arrays of NAND cells, support for very low zone sizes becomes increasingly challenging without wasting significant flash storage capacity and compromising on the storage device performance.

Next-generation flash storage devices include multiple dies, and each die may include multiple blocks. The flash storage devices may combine the multiple blocks to form a large block that may be referred to as a jumbo block. For example, a BICs6 flash storage device may include a jumbo block size of 400 MB. By having a large block allocated, the flash storage device can achieve maximum parallelism for maximum performance in both write and read operations. However, utilizing a jumbo block size allocation becomes increasingly challenging as the trending increase in physical block sizes continues as flash storage devices move towards subsequent generations.

Generally, in ZNS, one block (or multiple blocks) is allocated to a particular zone and sequential writes can be performed within the zone. As discussed above, this removes the need for the flash storage device to perform any garbage collection, achieving maximum performance. There may be specific requirements based on the application, where the zone sizes may need to vary. For example, the host device can allocate different zone sizes to different applications. In a particular application, where the maximum jumbo block size allocation is 400 MB, for example, the zone size allocation may be appropriate. However, in zones having significantly small sizes (e.g., 4 MB), the zone provisioning approach used by the host device may be substantially inefficient.

Another approach in ZNS may not allocate the blocks onto all dies, but rather the zone allocation may be limited to one physical block (or one die plane block), which reduces the size of the block in terms of a die plane block or a die plane. However, the read/write performance can degrade by the same amount because this approach may not effectively scale to other zones.

The aforementioned approaches include drawbacks that arise in large-sized blocks allocated to smaller sized zones. For example, a jumbo block that is allocated as a full block with 400 MB, for example, may be overprovisioned since the amount of capacity allocated within the blocks may not be required for sequential data as the block can be rewritten in part or in its entirety. In this regard, the provisioning of large-capacity blocks for small-sized zones may be inefficient.

To mitigate the aforementioned limitations or effects of ZNS (e.g. an inefficient overprovisioning of zones due to increased block sizes), the present disclosure provides for the provisioning of a first partition in flash memory having multiple dies as channels that is allocated to very low-sized zones to perform storage operations across all dies in parallel, where each block (or sub-block) in a die is allocated as a lowest level of erase unit for the first partition. The data that is the written to the first partition is synchronized with a second partition in memory that is a dedicated block to a particular zone such that the zone-specific data written in the first partition is then transferred to the second partition for that zone while the host device and storage device are in idle states, while maintaining the zone properties and reducing the overprovisioning.

In some aspects, the memory controller can allocate a lowest level of erase unit (e.g., a physical block or a sub-block) to a zone in the first partition of the flash memory. In some aspects, the controller may utilize sub-blocks for zones and mapping. In response to receiving a definition of zones from the host (e.g. a zone to logical address mapping) or some other message indicating that ZNS is to be used, the controller may map a zone to a sub-block. Each block that is to be mapped to a zone is divided into a number of sub-blocks. Such mapping prevents unused space in each block from arising due to increased block sizes, thus eliminating the wasted storage capacity that may result from traditional ZNS implementations. The sub-blocks may be configured to be independently programmable, readable, and eraseable; for example, different voltages may be applied to the word lines in a selected sub-block than in an un-selected sub-block to enable reading, programming, or erasing data in only the selected sub-block.

In some aspects, the memory controller may utilize a single-level cell (SLC) block (e.g., SLC jumbo block) for multiple zones. For example, the SLC jumbo-block may be accessed across all dies (or channels) to be shared by all low-sized zones allocated to the block. In some aspects, data for multiple zones can be written to a same SLC jumbo block. In some aspects, the data can be tracked by doing sequential writes for multiple zones. In some aspects, the first partition in the flash memory may be represented as an optional reference to the SLC jumbo block with no compaction in the SLC block. For example, there may be no data movement in the SLC block even after the block becomes full. In some aspects, write operations in the SLC block can be tracked with the second partition using a synchronized write pointer between the first partition and the second partition.

In this regard, the memory controller can perform write operations to the SLC block with parallelism across all dies for a specified zone, and only one-dimensional (1D) writes in the first partition. In some aspects, the memory controller can perform read operations from the first partition involving the SLC block for faster reads by using the SLC block optional references. In some aspects, the second partition includes a triple-level cell (TLC) block. In this regard, data movement between an SLC block to a TLC block may be performed with horizontal read operations across all dies in the jumbo block and single die writes in the background (e.g., host device and storage device are in idle states).

FIG. 1 shows an exemplary block diagram 100 of a storage device 102 which communicates with a host device 104 (also "host") according to an exemplary embodiment. The host device 104 and the storage device 102 may form a system, such as a computer system (e.g., server, desktop, mobile/laptop, tablet, smartphone, etc.). The components of FIG. 1 may or may not be physically co-located. In this regard, the host device 104 may be located remotely from storage device 102. Although FIG. 1 illustrates that the host device 104 is shown separate from the storage device 102, the host device 104 in other embodiments may be integrated into the storage device 102, in whole or in part. Alternatively, the host device 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host device 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host device 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host device 104. The NVM 110 can include, for example, flash integrated circuits, NAND memory (e.g., SLC memory, multi-level cell (MLC) memory, TLC memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host device 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
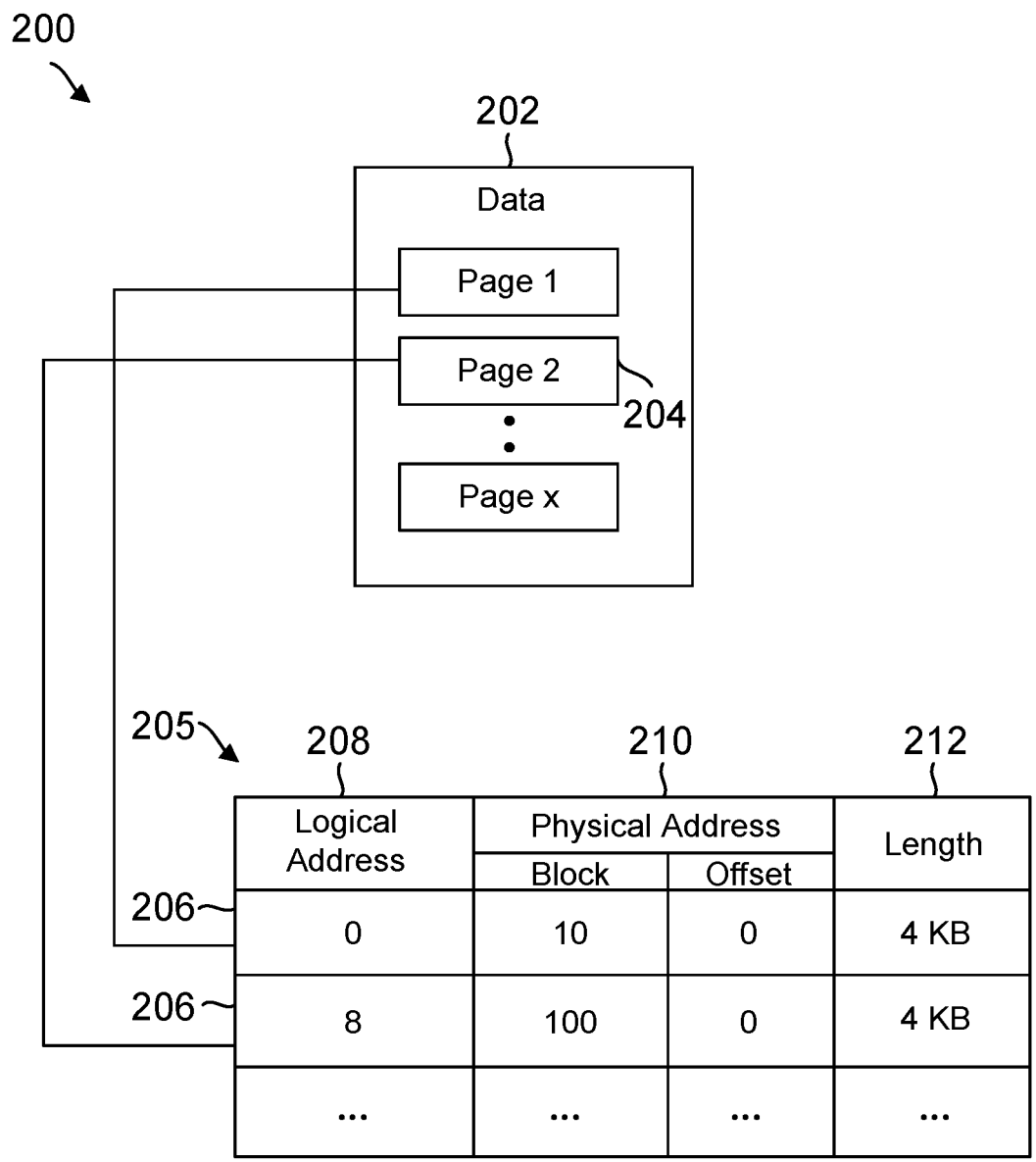
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host device 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an ASIC, a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host device 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host device 104 via the host interface 106.

Figure 3:
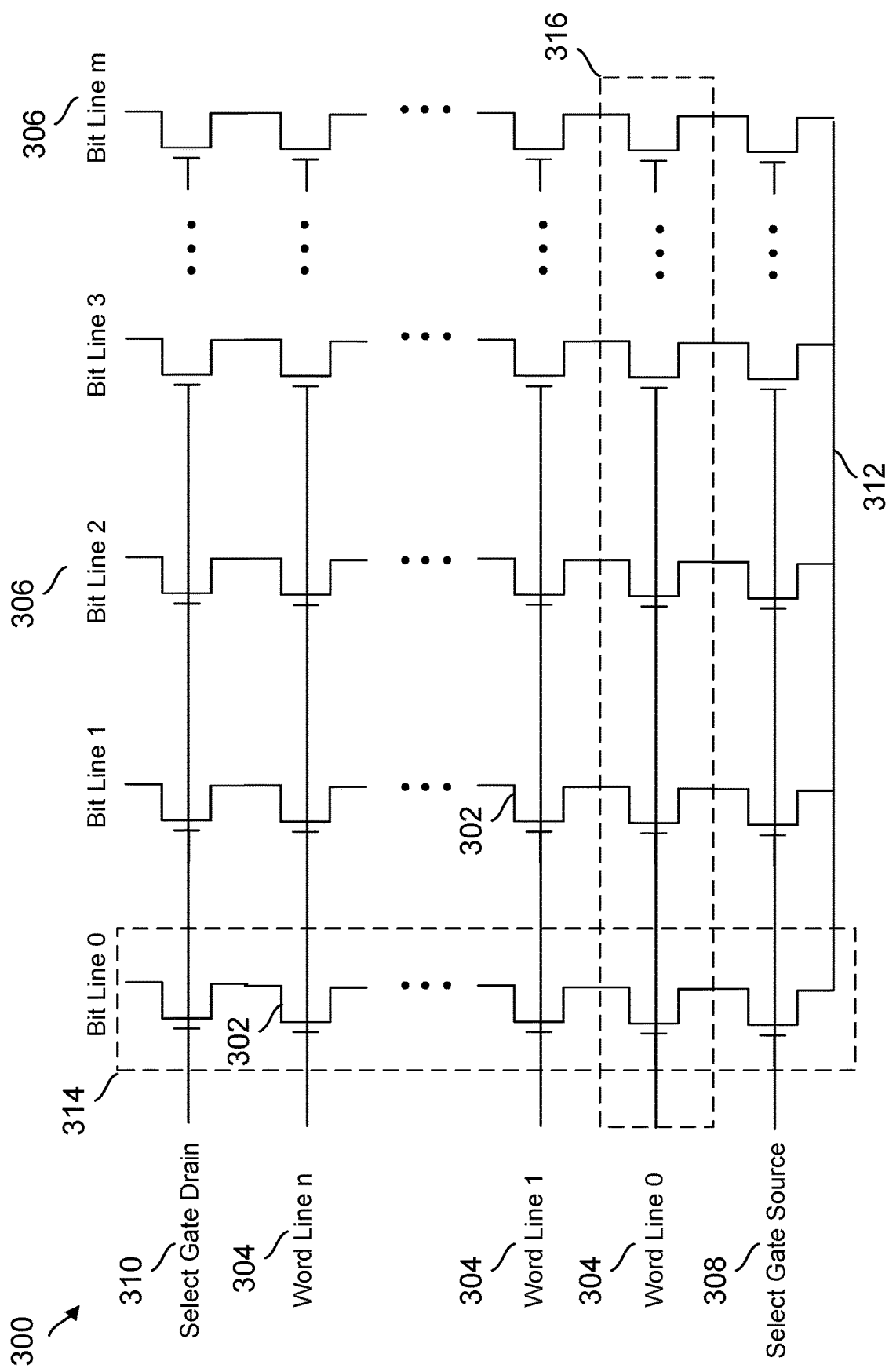
FIG. 3 is a conceptual diagram illustrating an example of an array of memory cells in the storage device of FIG. 1.

FIG. 3 illustrates an example of a NAND memory array 300 of cells 302. Cells 302 may correspond to cells 116 in the NVM 110 of FIG. 1. Multiple cells 302 are coupled to word lines 304 and bit lines 306. For example, the memory array 300 may include n word lines and m bit lines within a block of a die 114 of the NVM 110, where n and m are predefined according to the size of the block. Each word line and bit line may be respectively associated with a row and column address, which the controller 123 may use to select particular word lines and bit lines (e.g. using a row and column decoder). For example, word lines 0-n may each be associated with their own row address (e.g. word line 0 may correspond to word line address 0, word line 1 may correspond to word line address 1, etc.), and bit lines 0-m may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SGS and SGD cells 308, 310) coupled to one bit line within a block, while a page 316 may include a group of cells 302 coupled to one word line within the block.

Figure 4:
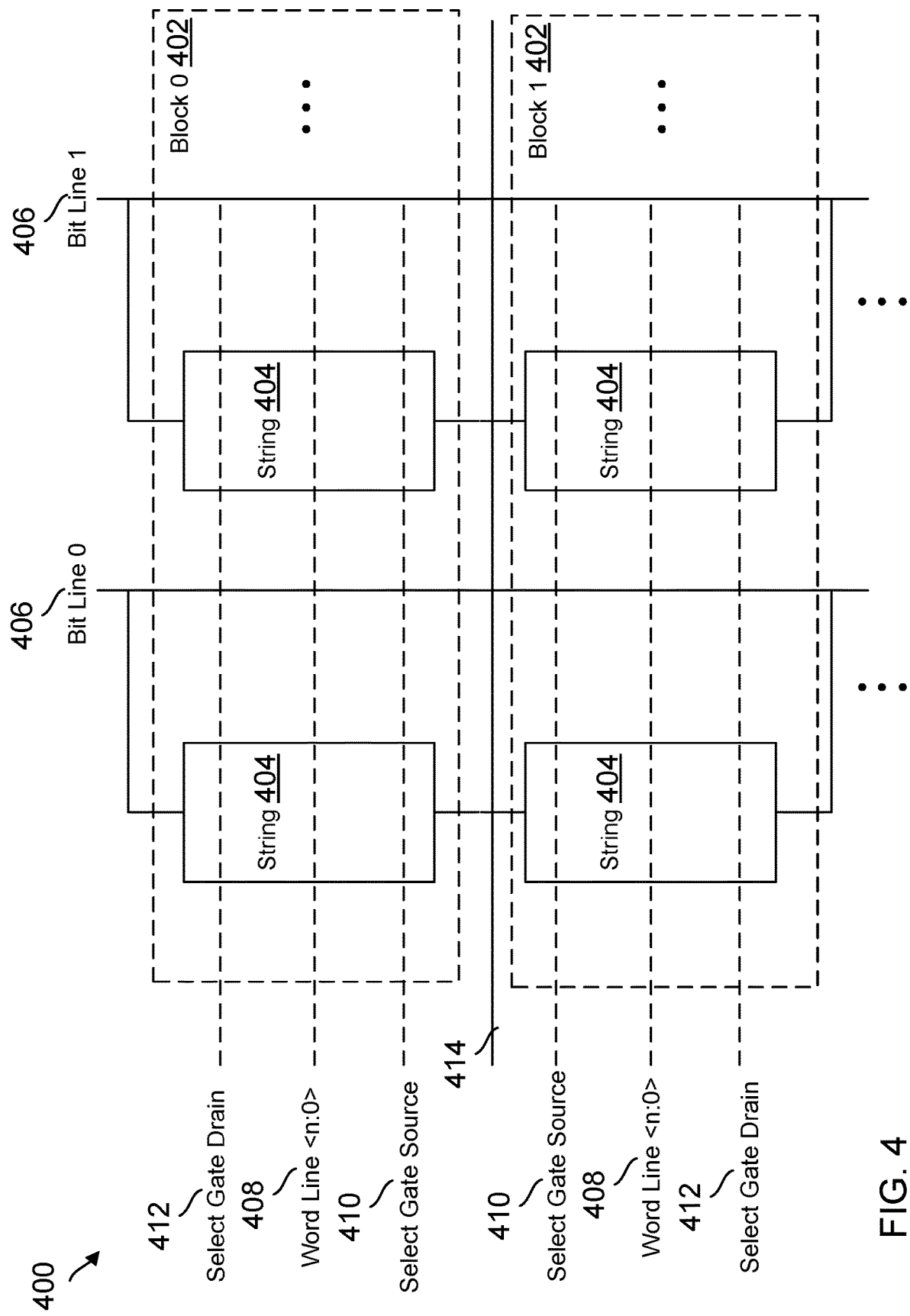
FIG. 4 is a conceptual diagram illustrating an example of an array of blocks in the storage device of FIG. 1.

FIG. 4 illustrates an example of a NAND memory array 400 of blocks 402 including multiple strings 404. Blocks 402 may correspond to blocks of a die 114 in the NVM 110 of FIG. 1, and strings 404 may each correspond to string 314 in FIG. 3. As in the memory array 300 of FIG. 3, each string 404 may include a group of memory cells each coupled to a bit line 406 and individually coupled to respective word lines 408. Similarly, each string may include a SGS cell 410 and SGD cell 412 which respectively connects the memory cells in each string 404 to a source line 414 and bit line 406.

When the controller 123 reads data from or writes data to a page 316 of cells 302 (i.e. on a word line 304, 408), the controller may send a command to apply a read voltage or program voltage to the selected word line and a pass through voltage to the other word lines. The read or programmed state of the cell (e.g. a logic '0' or a logic '1' for SLCs) may then be determined based on a threshold voltage of the cells 302. For example, during an SLC read operation, if the threshold voltage of a cell 302 is smaller than the read voltage (i.e. current flows through the cell in response to the read voltage), the controller 123 may determine that the cell stores a logic '1', while if the threshold voltage of the cell 302 is larger than the read voltage (i.e. current does not flow through the cell in response the read voltage), the controller 123 may determine that the cell stores a logic '0'. Similarly, during an SLC program operation, the controller may store a logic '0' by sending a command to apply the program voltage to the cell 302 on the word line 304, 408 until the cell reaches the threshold voltage, and during an erase operation, the controller may send a command to apply an erase voltage to the block 402 including the cells 302 (e.g. to a substrate of the cells such as a p-well) until the cells reduce back below the threshold voltage (back to logic '1').

For cells that store multiple bits (e.g. MLCs, TLCs, etc.), each word line 304, 408 may include multiple pages 316 of cells 302, and the controller may similarly send commands to apply read or program voltages to the word lines to determine the read or programmed state of the cells based on a threshold voltage of the cells. For instance, in the case of TLCs, each word line 304, 408 may include three pages 316, including a lower page (LP), a middle page (MP), and an upper page (UP), respectively corresponding to the different bits stored in the TLC. In one example, when programming TLCs, the LP may be programmed first, followed by the MP and then the UP. For example, a program voltage may be applied to the cell on the word line 304, 408 until the cell reaches a first intermediate threshold voltage corresponding to a least significant bit (LSB) of the cell. Next, the LP may be read to determine the first intermediate threshold voltage, and then a program voltage may be applied to the cell on the word line until the cell reaches a second intermediate threshold voltage corresponding to a next bit of the cell (between the LSB and the most significant bit (MSB)). Finally, the MP may be read to determine the second intermediate threshold voltage, and then a program voltage may be applied to the cell on the word line until the cell reaches the final threshold voltage corresponding to the MSB of the cell. Alternatively, in other examples, the LP, MP, and UP may be programmed together (e.g., in full sequence programming or Foggy-Fine programming), or the LP and MP may be programmed first, followed by the UP (e.g., LM-Foggy-Fine programming). Similarly, when reading TLCs, the controller 123 may read the LP to determine whether the LSB stores a logic 0 or 1 depending on the threshold voltage of the cell, the MP to determine whether the next bit stores a logic 0 or 1 depending on the threshold voltage of the cell, and the UP to determine whether the final bit stores a logic 0 or 1 depending on the threshold voltage of the cell.

Figure 5:
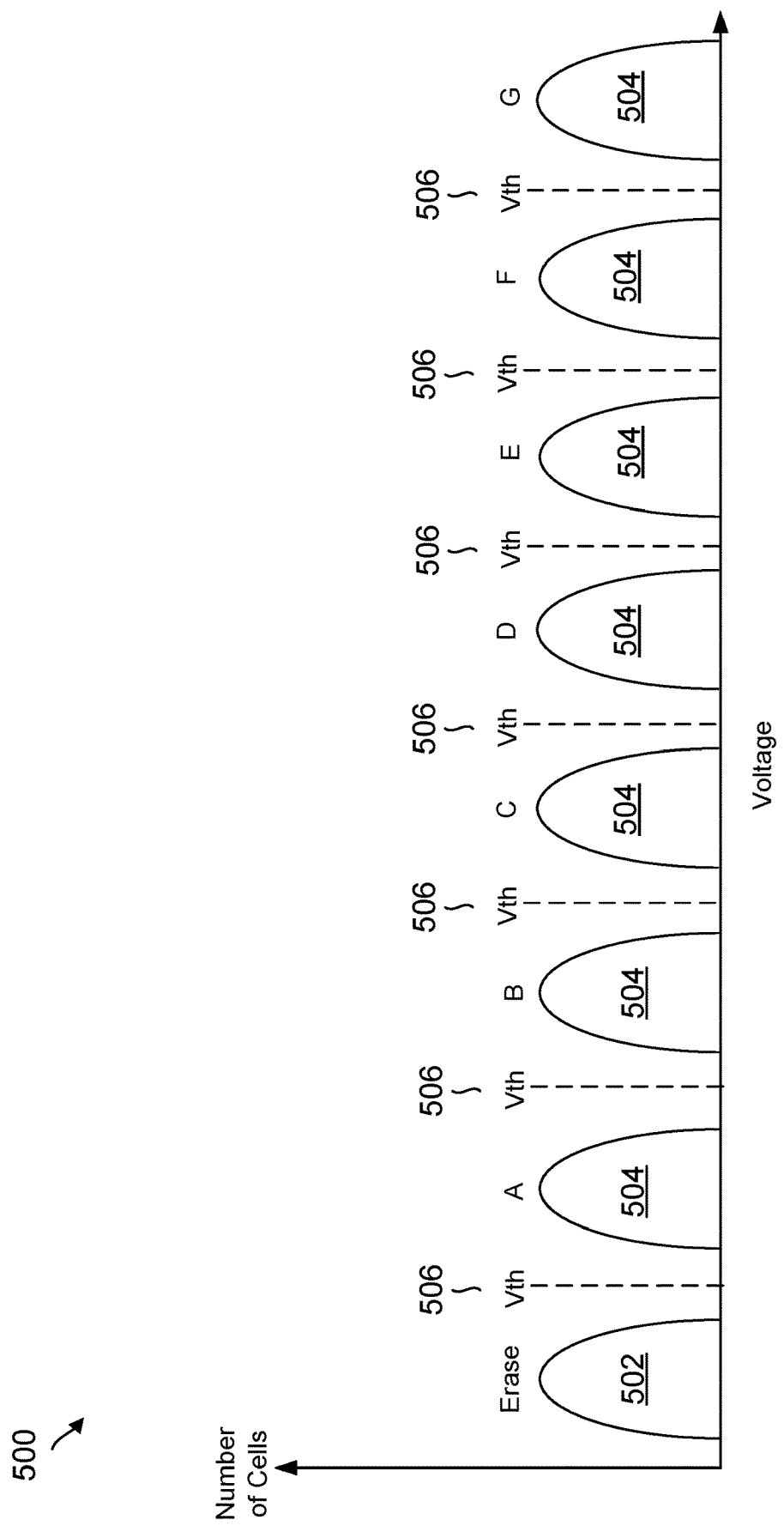
FIG. 5 is a graphical diagram illustrating an example of a voltage distribution chart for triple-level cells in the storage device of FIG. 1.

FIG. 5 illustrates an example of a voltage distribution chart 500 illustrating different NAND states for TLCs (e.g. cells 116, 302) storing three bits of data (e.g. logic 000, 001, etc. up to logic 111). The TLCs may include an erase state 502 corresponding to logic '111' and multiple program states 504 (e.g. A-G) corresponding to other logic values '000-110'. The program states 504 may be separated by different threshold voltages 506. Initially, the cells 116, 302 may be in the erase state 502, e.g. after the controller 123 erases a block 402 including the cells. When the controller 123 program LPs, MPs, and UPs as described above, the voltages of the cells 116, 302 may be increased until the threshold voltages 506 corresponding to the logic values to be stored are met, at which point the cells transition to their respective program states 504. While FIG. 5 illustrates eight NAND states for TLCs, the number of states may be different depending on the amount of data that is stored in each cell 116, 302. For example, SLCs may have two states (e.g. logic 0 and logic 1), MLCs may have four states (e.g. logic 00, 01, 10, 11), and QLCs may have sixteen states (e.g. erase and A-N).

When the controller 123 attempts to program cells 116, 302 of a selected word line 304, 408 into one of the program states 504, the controller may perform incremental step pulse programming (ISPP) over a number of programming loops or ISPP cycles. For example, a programming voltage (e.g. a high voltage) may be applied to the selected word line 304, 408, a pass through voltage (e.g. a high voltage lower than the programming voltage) may be applied to the other word lines 304, 408, a bit line program voltage (e.g. a low voltage) may be applied on the bit lines 306, 406 connected to the selected cells being programmed on the selected word line, and a bit line inhibit voltage (e.g. a high voltage) may be applied on the bit lines 306, 406 connected to the other cells not being programmed on the selected word line. Applying a high programming voltage to the selected word line and a low voltage to the selected bit lines allows electrons to tunnel from the channel into the charge trapping layer of those selected cells, thereby causing the threshold voltage of the cells to increase. On the other hand, applying a high voltage to unselected bit lines inhibits electrons from tunneling from the channel into the charge trapping layer of those unselected cells, thereby preventing the threshold voltage of those cells from increasing. Thus, bit lines coupled to cells programmed to lower states may be inhibited to prevent the threshold voltage of those cells from increasing while other cells are programmed to higher states. For instance, in the case of TLCs, the bit lines of cells that are first programmed into the A state may be inhibited first, followed by the bit lines of different cells that are programmed into the B state, followed by those that reach the C state, then the D state, and so forth until the remaining cells on the selected word line ultimately reach the G state and all cells on the selected word line have been programmed.

After the programming voltage is applied in one programming loop or ISPP cycle, a program verify voltage (e.g. a low voltage) may be applied to the word line 304, 408 to determine whether the threshold voltage of a cell has increased beyond a respective threshold voltage into an intended program state. If none of the cells have transitioned into an intended programming state, then another programming loop or ISPP cycle is performed in which a higher programming voltage may be applied to further increase the threshold voltage of the cells. Subsequently, a program verify voltage may again be applied to determine whether the threshold voltage of a cell has transitioned into an intended program state. The above process of incrementally increasing the programming voltage and verifying the voltage threshold of the selected cells may be repeated over a number of programming loops. If the cells transition into their respective programming states and the total number of programming loops does not exceed a predetermined loop count, the controller may determine that the cells have entered their intended program states and are thus successfully programmed. Otherwise, if the total number of programming loops exceeds the predetermined loop count before the cells transition into their respective programming states, the controller may determine that a program failure has occurred.

Figure 6:
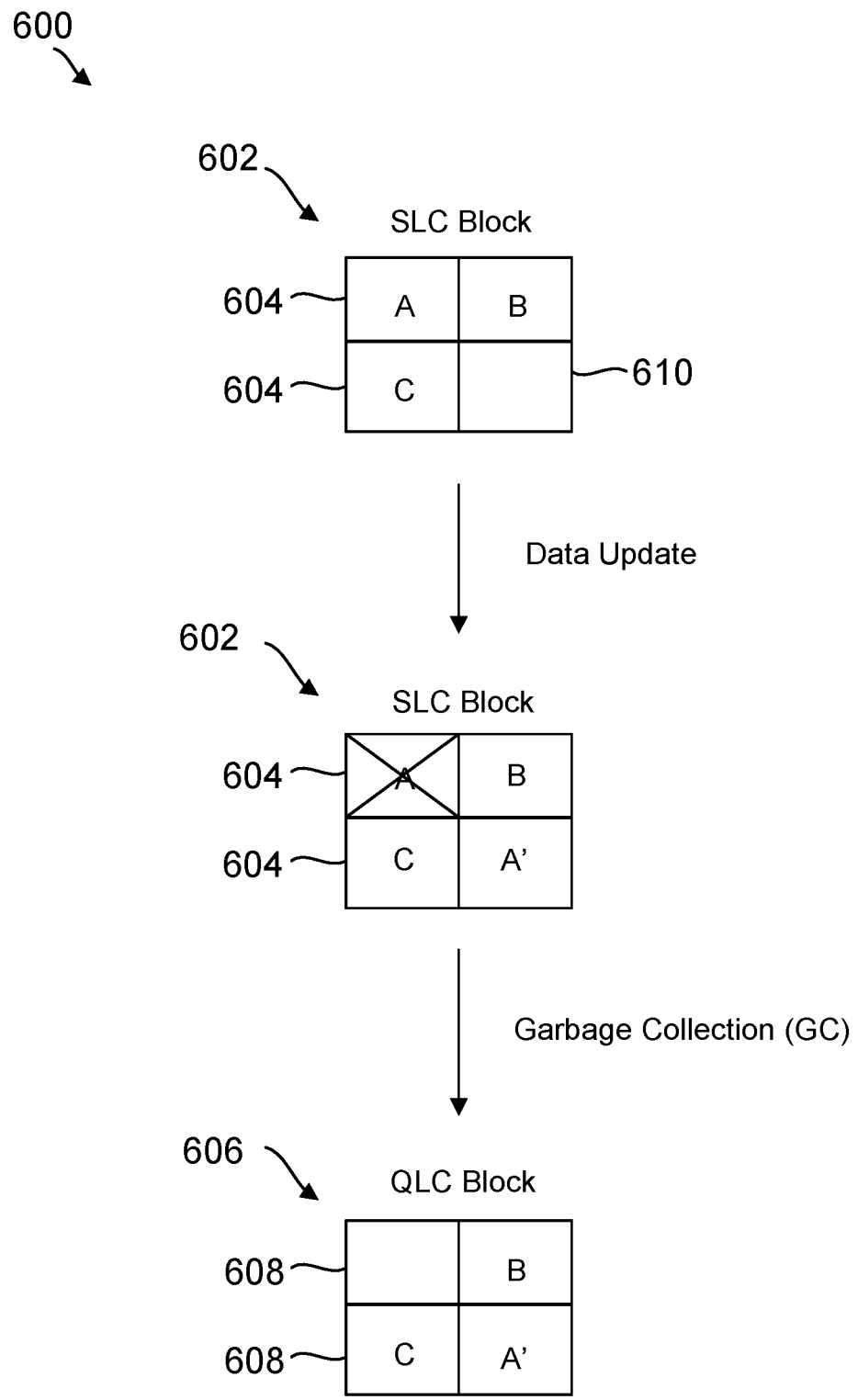
FIG. 6 is a conceptual diagram illustrating an example of a garbage collection (GC) process that may be implemented in the storage device of FIG. 1.

FIG. 6 is a conceptual diagram 600 of an example of a garbage collection process in which data stored in pages 604 of a block 602 of SLC cells are relocated to pages 608 of a block 606 of QLC cells. The data may correspond to the data 119 of FIG. 1, the blocks 602, 606 may correspond to the blocks 402 of FIG. 4, and the SLC/QLC cells may correspond to the cells 116, 302 of FIGS. 1 and 3. Each page 604, 608 includes data stored in multiple cells along a same row or word line (e.g. word line 304, 408) of the NVM. Thus, each page 604 may include data stored in a row of the cells 116 of one block, while each page 608 may include data stored in a row of the cells 116 of another block. For simplicity of illustration, the example of FIG. 6 illustrates the blocks 602, 606 each including only four pages 604, 608. However, it should be recognized that each block may include any number of pages.

In the example of FIG. 6, data represented by identifiers A, B, and C are stored in different pages 604 of the block 602. Originally, the data A, B, and C are stored in three pages of the block 602 in response to write commands from the host device, leaving one of the pages free in this example. When the storage device receives new or updated data, this data is stored in the free page 610. For example, updated data A' may be received from the host device and written to the free page 610. Since data cannot be overwritten in flash memory, the invalid data A remains stored in the block 602. As a result of new data and invalid data, the block 602 may quickly become full.

To free space in the SLC block, original and updated data in the block 602 may be transferred to the block 606. The invalid data remain in the old block. For instance, in the example of FIG. 6, the original data B and C and the updated data A' are read from the pages 604 of the block 602 and written to one or more pages 608 of the block 606. The invalid data A remains in the block 602. When the block 602 is subsequently erased, the invalid data is discarded, and the block 602 may be reused to store new data.

However, such GC process may lead to increased write amplification of the storage device 102, for example, in cases where multiple 4 KB data overwrites occur. To reduce or eliminate GC and thereby reduce write amplification of the storage device, the storage device 102 may implement ZNS, in which groups of contiguous, non-overlapping logical addresses are divided into zones.

Figure 7:
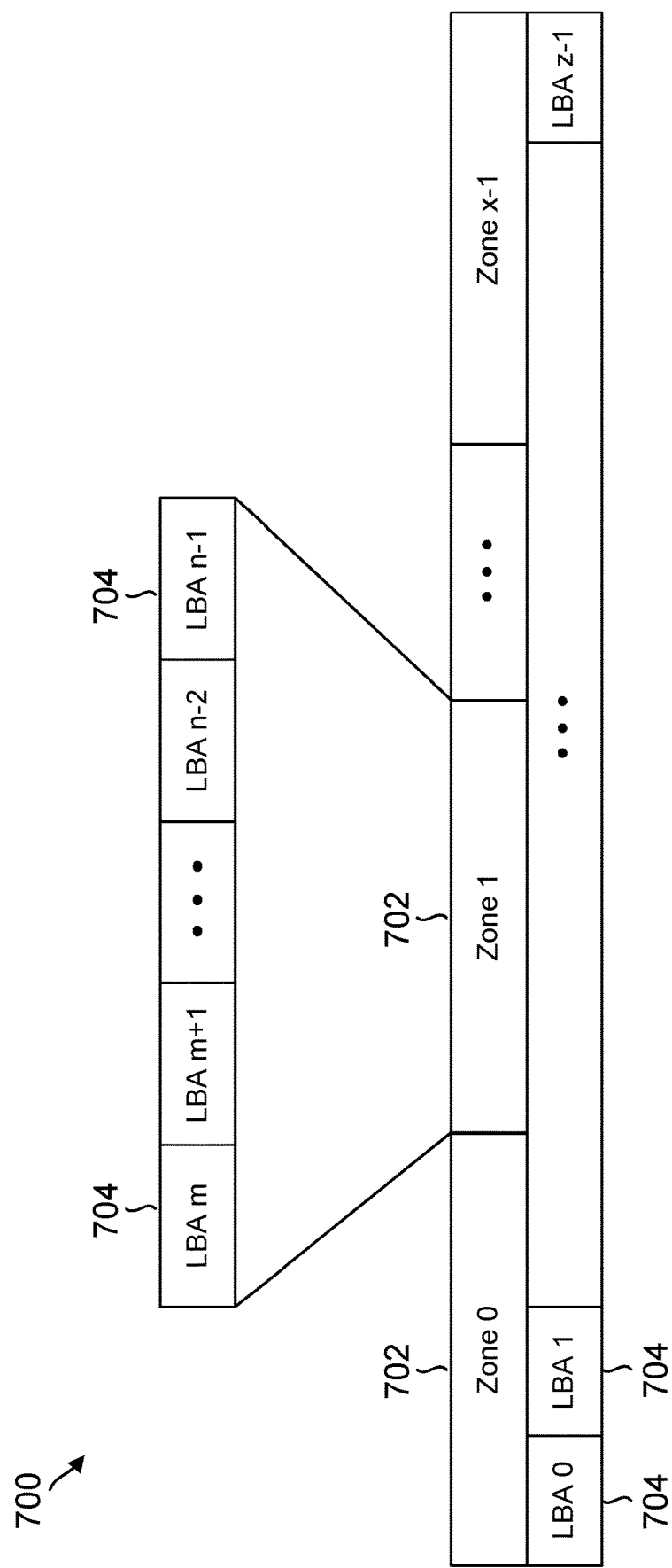
FIG. 7 is a conceptual diagram illustrating an example of an association of zones to groups of logical addresses that is received by the storage device of FIG. 1.

FIG. 7 illustrates a conceptual diagram 700 of an example of zones 702. Each zone 702 is fixed in size and includes a contiguous range of sequential logical addresses 704 in the NVM 110. For instance as illustrated, the NVM 110 may include a total of z LBAs that are divided into x zones, with each zone including a range of n–m sequential LBAs, where z represents the total number of sectors in flash memory, x represents the number of zones, m represents a first LBA in a zone, and n represents a last LBA in the same zone. Each zone may be separately used by the host device 104 for storing data associated with one or more applications run by the host device 104. Thus, the host device 104 may divide the LBAs into a number of zones depending on the number of applications run by the host device 104.

Figure 8:
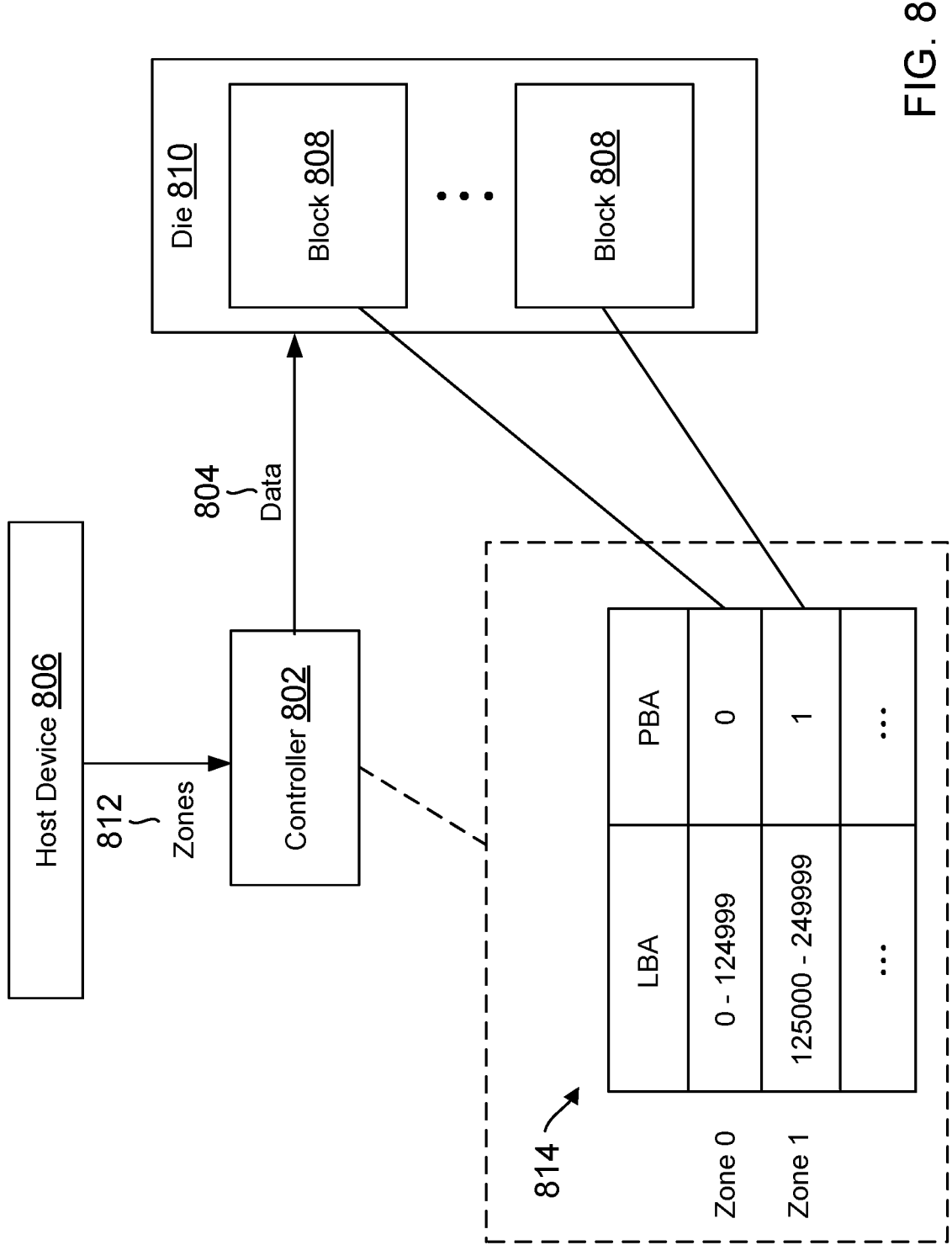
FIG. 8 is a conceptual diagram illustrating an example of a controller of the storage device of FIG. 1 that writes data to blocks mapped to different zones.

FIG. 8 illustrates an example diagram 800 of a controller 802 of a storage device that writes data 804 received from a host device 806 in blocks 808 of a die 810 according to zones 812. For example, controller 802 may correspond to memory controller 123 of the storage device 102 in FIG. 1, host device 806 may correspond to host device 104 in FIG. 1, blocks 808 may correspond to blocks 402 of FIG. 4, data 804 may correspond to data 119 of FIG. 1. Traditionally, the host device 806 may send a definition of the zones 812 (e.g. a mapping of zones to logical addresses 604 in FIG. 6) to the controller 802, and the controller 802 may create an L2P mapping table 814 (e.g. L2P mapping table 120, 205) that maps the LBAs of each zone 812 (e.g. logical addresses 604) to a single physical block (e.g. block 402). In the example of FIG. 8, each zone is assumed to span 64 MB in size with a 512 byte sector size, and thus each zone may include 125000 LBAs. Moreover, each block is assumed to be able to store 64 MB of data. Thus, zone 0 may be mapped solely to one block (e.g. PBA 0), zone 1 may be mapped solely to another block (e.g. PBA 1), etc. Each application of the host may then write data to a respective zone, e.g., by indicating a sequential range of LBAs to the controller. For instance, the host device 806 may send write commands to the controller 802 to write data sequentially from LBA 0 to LBA 124999 and/or sequentially from LBAs 125000 to 249999. The controller may translate the indicated LBAs to the mapped physical address (e.g. PBA 0 or 1 respectively), and write the data in the mapped block 808 accordingly. Thus, the host device 806 may write data from different applications into different physical blocks individually corresponding to different zones.

In some aspects, the host device 806 may not write and invalidate data page by page (e.g. between 4 KB commands) as described above in FIG. 5. For example, when writing data to zone 1 in FIG. 6, the host device 806 may not simply write data to LBA m, and then immediately afterwards write new data to LBA m while invalidating the old data at LBA m. Rather, the entire zone must be fully written (i.e. from LBA m to LBA n–1 in one or multiple writes) before writing data again to previous LBAs in that zone. Thus, in the example of FIG. 8 with respect to zone 0, if the host writes data in LBA 0, the host must continue to write data sequentially from LBA 1 until LBA 124999 (in one or multiple writes at various times) before the host can eventually write new data back in LBA 0. This feature of ZNS prevents blocks mapped to various zones from including partially invalid data that would require GC (such as shown in FIG. 5), thus reducing or eliminating GC.

While zone sizes remain fixed in ZNS, block sizes tend to scale or increase over time. Such scaling may cause additional, unused storage space to result when mapping fixed-size zones to individual physical blocks. Allocating this additional space to another zone would defeat the benefit of ZNS since GC would likely be required in such instance. For example, if one zone is completely written to a scaled block (and thus can be invalidated) while another zone is only partially written to the remainder of the scaled block (and thus cannot be invalidated), GC would still be required to protect the valid data.

To mitigate these limitations of ZNS, the present disclosure provides for the provisioning of a first partition in the flash memory having multiple dies as channels that is allocated to a very low-sized zone (e.g., 4 MB, 8 MB, or the like) to perform storage operations across all dies in parallel, where each block 808 (or sub-block) in a die (e.g., 810) is allocated as a lowest level of erase unit. The data that is written to the first partition is synchronized with a second partition in memory that is designated to that zone such that the data of that zone is then transferred to the second partition while the host device and storage device are in idle states, while maintaining the zone properties and reducing the overprovisioning.

The memory controller 802 can allocate a lowest level of erase unit (e.g., a physical block or a sub-block) to the zone in the first partition of the flash memory. In some aspects, the memory controller 802 may utilize a SLC block (e.g., SLC jumbo block) as the first partition for multiple zones. For example, the SLC jumbo-block may be accessed across all dies (or channels) to be shared by all small-sized zones allocated to the SLC block. In some aspects, data for multiple zones can be written to a same SLC jumbo block.

In some aspects, the first partition in the flash memory may be represented as an optional reference to the SLC jumbo block with no compaction in the SLC block. For example, there may be no data movement in the SLC block even after the block becomes full. In some aspects, the data can be tracked by doing sequential writes for multiple zones.

For example, write operations in the SLC block can be tracked with the second partition using a synchronized write pointer between the first partition and the second partition.

In this regard, the memory controller 802 can perform write operations to the SLC block with parallelism across all dies for a specified zone, and only 1D writes in the first partition. In some aspects, the memory controller 802 can perform read operations from the first partition involving the SLC block for faster reads by using the SLC block optional references. In some aspects, data movement between an SLC block to a TLC block may be performed with horizontal read operations across all dies in the jumbo block and single die writes in the background (e.g., host device 806 and storage device 102 are in idle states).

Figure 9:
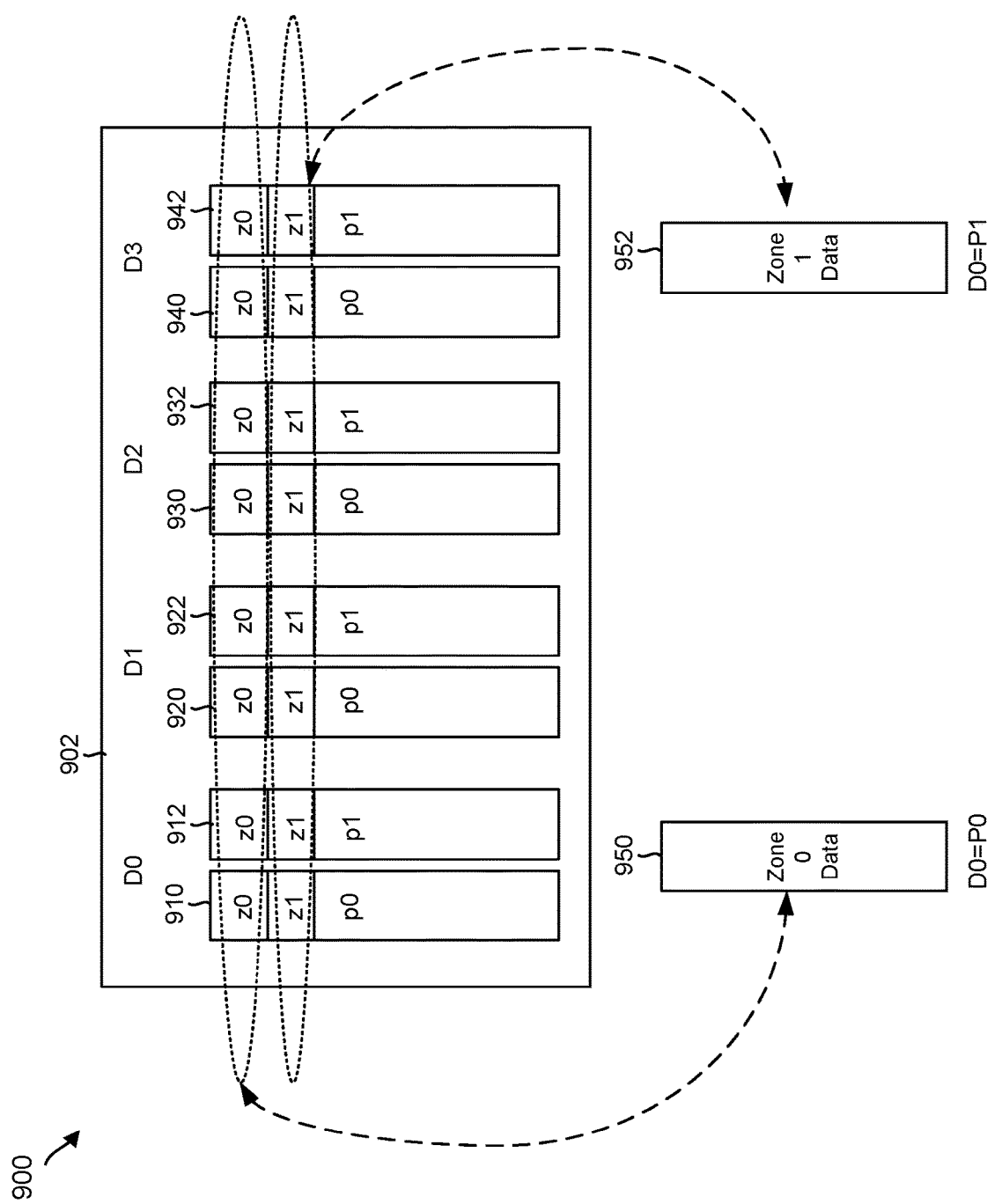
FIG. 9 illustrates an example diagram of a storage device having a first partition containing die plane blocks and second partitions associated with different zones.

FIG. 9 illustrates an example diagram 900 of a storage device having a first partition 902 containing die plane blocks 910, 912, 920, 922, 930, 932, 940, 942 and second partitions 950, 952 associated with different zones. In some aspects, the storage device as depicted in FIG. 9 may correspond to a BICs6 flash storage device utilizing SLC cells, where the main partition 902 may correspond to a SLC block that represents a jumbo block having a size of 400 MB and the size of each zone may be 1 MB, however, the block sizes and/or zone sizes can vary depending on implementation.

As discussed above, if a jumbo block in its entirety of size 400 MB is allocated to support a zone size of 1 MB, then the jumbo block is overprovisioned to support the small-sized zones as many open blocks may remain within the jumbo block after sequential writes are completed. Also as previously discussed, other ZNS approaches may include the formation of zones allocated to one die plane block (e.g., both planes in a die) or to one die plane block. However, this approach may not benefit from the use of die parallelism for a particular zone, resulting in an adverse impact to performance.

To mitigate the aforementioned limitations, the present disclosure provides for a SLC jumbo block denoted as the first partition 902, which is shared by all zones allocated to the block and data written to the block can be mixed for all zones. The data that is written to the first partition 902 can be immediately moved to an actual zone block in second partitions (e.g., 950, 952) and optional references can be maintained in the first partition 902. In this regard, the data in the SLC cells of the first partition 902 can be discarded at any point of time to avoid any compaction.

In a storage device, there are multiple integrated circuit packages (e.g., chips and/or dies) coupled to one another, where the multiple dies can be accessed in parallel. As illustrated in FIG. 9, each column represents one die plane block, where p0, p1 each represents one plane, and D0-D3 each represents one die. The first partition 902 includes a first die (depicted as "D0") that includes die plane blocks 910 and 912, a second die (depicted as "D1") that includes die plane blocks 920 and 922, a third die (depicted as "D2") that includes die plane blocks 930 and 932, and a fourth die (depicted as "D3") that includes die plane blocks 940 and 942. In this regard, the main partition 902 includes a total of eight die plane blocks. Each of the die plane blocks may correspond to a full block in some implementations, or may correspond to a sub-block in other implementations. If the first partition 902 has a block size of 400 MB, then each die plane block may correspond to a block size of 50 MB.

The first partition 902 may not be limited to one block allocation, and can cater to multiple zones so performance can be maintained. When one jumbo block is utilized as the first partition 902, which can span across all dies, the data can be written to all the die plane blocks of the first partition 902 in parallel to achieve the maximum parallelism in data storage. As discussed above, there may be multiple zones that can be allocated to the block and can be shared with other zones. For example, each of the die plane blocks 910, 912, 920, 922, 930, 932, 940, 942 may be allocated to one or more zones (e.g., zone 0, zone 1, . . . , zone N), where each of the zones may correspond to a block size of either 4 MB or 8 MB. As illustrated in FIG. 9, zone 0 and zone 1 can be combined.

In some aspects, when a zone is to be deleted or reset, criteria can be defined for a zone based approach, such as ZNS. In this regard, the criteria for writing/reading to zones can be defined by the host. As discussed above, the zones can be negotiated and assigned between a host and a storage device. For example, there is a pre-agreement between the host and storage device as to how zone data may be handled by the storage device by deciding which write operations are to be performed in the multiple zones. If the storage device has a non-volatile memory capacity of 128 GB, then the host can divide the logical range of the non-volatile memory capacity into multiple logical zones. For example, the host may intend to write 100 GB of data, of which the host can write 1 GB chunks of data over 100 allocated zones. Within a 1 GB block, the memory controller can maintain the sequential write sequence. The memory controller can write 0 to 1 GB over one row of allocated zones across all die plane blocks 910, 912, 920, 922, 930, 932, 940, 942, and return to write 0 to 1 GB in a next row of allocated zones across all the die plane blocks 910, 912, 920, 922, 930, 932, 940, 942, and so on.

When a host engages with a storage device to store host data in the storage device, the host may first determine the number of zones available and initiate allocations of the available zones. During this zone allocation by the host, the host can specify to the memory controller the zone size allocation and the manner in which the storage operations at the zones are to occur (e.g., sequential or random). In some aspects, zone attributes can be defined by the host when the zone is being allocated based on a host application. For instance, while the host sets zone attributes (e.g., zone size, zone manner of use) for the storage device, these zone attributes may be defined while the zones are being allocated dynamically in real time. In some aspects, when the host is attempting to use a zone for an application that requires a high throughput, the host can allocate a sequential number of zones for a higher allocated block size (e.g., 4 MB, 8 MB, or more per zone). In some aspects, the host may be aware that zones having a smaller footprint may be required but the data may need to be accessed sequentially, thus allocating the smaller sized zones. In some cases, the host may need to access a range of logical block addresses in a random fashion, thereby the host may not allocate sequential zones but rather random zones. The memory controller is configured in advance to know that for a particular range of logical block addresses, the zones may not be accessed sequentially but rather randomly. In some aspects, the memory controller may handle these logical block address ranges differently between sequential and random modes of operation.

In one or more implementations, the data being written to the first partition 902 is different across the different die plane blocks 910, 912, 920, 922, 930, 932, 940, 942. Once the data is written, the next write is performed on a next row of zones until the block becomes full. In some aspects, the memory controller may perform a first write operation with 16 KB of data to the first die plane block 910 (e.g., p0 of D0). As illustrated in FIG. 9, there are eight total planes, where each die includes a first plane (e.g., p0) and a second plane (e.g., p1), in which the memory controller can write 16 KB of data to each plane in parallel, thus writing 128 KB chunk of data in parallel across all die planes. In this example, 16 KB of data can be written on a per plane basis, and 128 KB of data can be written on a jumbo block basis. This sequential write sequence represents the performance gain due to the parallelism.

When an application running on the host is writing data to the die plane blocks (e.g., 910, 912, 920, 922, 930, 932, 940, 942) in the jumbo block, the storage operation can be performed at the foreground observable to the host. As described above, different data can be written across the dies to obtain the maximum performance. When the application becomes idle (e.g., the host is not performing any operations), the storage device becomes idle. The host can write smaller chunks of data when it is writing, where the amount of data being written does not require a large burst. On the storage device side, the data arrives sequentially. In some aspects, a write operation can occur sequentially across all dies (e.g., D0-D3) per zone, and an erase operation can occur per die plane block (e.g., 910, 912, 920, 922, 930, 932, 940, 942). In ZNS, for example, a 16 KB block may not be erased solely, but rather an entire die plane block may need to be erased in its entirety first so that the die plane block can be subsequently rewritten.

Each of the partitions 950 and 952 may have an allocation that corresponds to a minimum unit size allocated to a zone (e.g., ⅛th of the total jumbo block size at 400 MB corresponds to 50 MB). When the host and the storage device are in idle states, the memory controller can move the data stored in the jumbo block die plane blocks to a corresponding location within one of the second partitions 650, 652 in background. For example, the memory controller may transfer zone 0 data to the second partition 950 and zone 1 data to the second partition 952. In this regard, when high throughput data storage is required, the write operations are performed on the jumbo block with parallel writes across all die plane blocks 910, 912, 920, 922, 930, 932, 940, 942. On the other hand, when the higher throughput data storage is not required, the data is moved to the slower blocks per zone (e.g., second partitions 950, 952). The host may not see the data movement between the jumbo block die plane blocks and the second partition blocks in the background.

Figure 10:
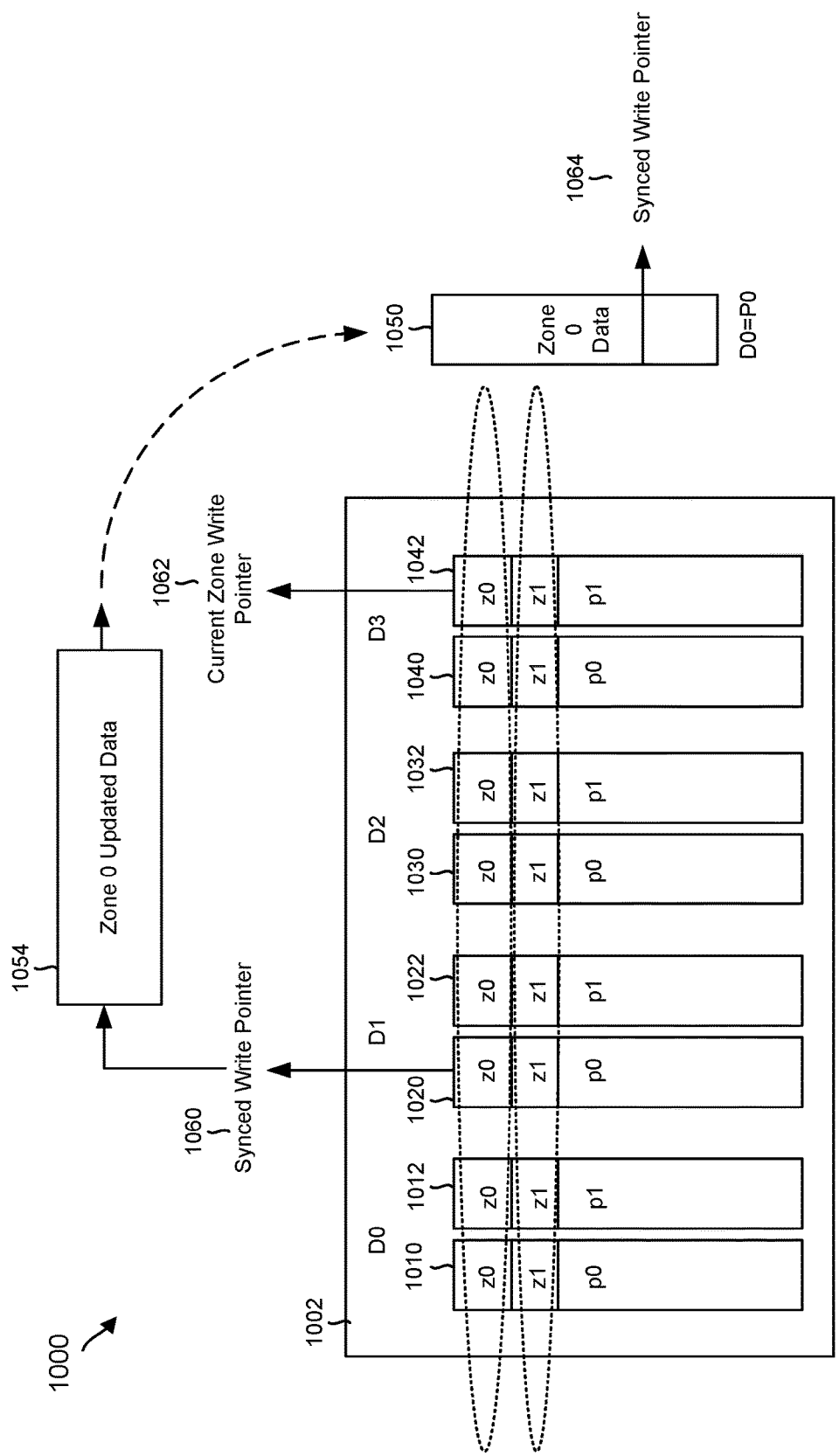
FIG. 10 illustrates an example diagram of a memory transfer between a first partition with multiple die blocks and a second partition associated with a particular zone following a write operation.

FIG. 10 illustrates an example diagram 1000 of a memory transfer between a first partition with multiple die blocks and a second partition associated with a particular zone following a write operation. The diagram 1000 depicts a first partition 1002 containing die plane blocks 1010, 1012, 1020, 1022, 1030, 1032, 1040, 1042 and a second partition 1050 associated with a first zone (e.g., zone 0). For example, die plane blocks 1010, 1012, 1020, 1022, 1030, 1032, 1040, 1042 may correspond to die plane blocks 910, 912, 920, 922, 930, 932, 940, 942 of FIG. 9, and second partition 1050 may correspond to second partition 950 of FIG. 9. In some aspects, the second partition 1050 may be associated to one zone such that data of that zone is exclusively transferred and written to the second partition 1050 in the background. In some embodiments, the second partition 1050 includes one die.

In some aspects, the memory controller utilizes a first write pointer 1060 to indicate a location of written data within in the first partition 1002 for a specified zone to transfer to the second partition 1050. Similarly, the memory controller utilizes a second write pointer 1064 to indicate a location within the second partition 1050 that is synchronized with the memory location with the first partition 1002. In this regard, the second write pointer 1064 is moved to be synchronized with the first write pointer 1060. As such, the second partition 1050 can include the same data stored in the memory locations of the first partition 1002 up to a location indicated by the write pointer 1060.

In some aspects, the memory controller can perform write operations to write data horizontally across all dies in parallel to achieve maximum write performance. At each time delta, the written data indicated by the write pointer 1060 and a current zone write pointer 1062 are continuously moved to a respective zone block. For example, the first write pointer 1060 is advanced after each data transfer from the first partition 1002 to the second partition 1050. The current zone write pointer 1062 may indicate the last written location in the first partition 1002 such that the current zone write pointer 1062 is advanced after each write operation at a specified die plane block. In some aspects, the first write pointer 1060 and the current zone write pointer 1062 are maintained for each zone.

As data is written to a zone (e.g., z0) at the die plane block 1042, the write pointer 1062 is advanced or updated to point to or to indicate the next available die plane block in the zone to write data to in order to track the next write starting point (i.e., the completion point of the prior write equals the starting point of a subsequent write). Thus, the write pointer 1062 indicates where the subsequent write to the zone will begin. Subsequent write commands are 'zone append' commands, where the data associated with the subsequent write command appends to the zone at the location the write pointer 1062 is indicating as the next starting point. An ordered list of LBAs within the zone may be stored for write ordering. In some aspects, each zone may have its own write pointer 1062. Thus, when a write command is received, the write pointer 1062 determines where the write of the data begins within the identified zone 1062.

In a read operation, data can be read horizontally from all dies and moved to a single die in background. As illustrated in FIG. 10, when read operations are performed at the first partition 1002, the read data is moved to the second partition 1050 in the background (e.g., when host and storage device are in idle states).

As a write operation is performed in the faster access zone (e.g., at a die plane block of the first partition 1002), data is written to a first zone (e.g., zone 0) and the zone 0 is updated (noted by a zone 0 updated data block 1054). For each zone, the previous write pointer location that is already synchronized with this particular portion of the first zone is maintained as well as any additional data the memory controller is writing. In the background, the write pointers 1060 and 1064 are synchronized. When 128 KB chunk of data, for example, is written to a first row of sequential zones (e.g., zone 0 across the die plane blocks 1010, 1012, 1020, 1022, 1030, 1032, 1040, 1042), the data is written to the second partition 1050 in the background to synchronize the second partition 1050 with the zone 0 data in the first partition 1002. When the memory controller writes another 128 KB chunk of data for zone 0, the first partition 1002 can provide additional zone 0 updated data that is then moved to the second partition 1050 in the background. Prior to the synchronization event between the first partition 1002 and the second partition 1050, the data written in the first partition 1002 is the only copy (or master copy). For a period of time, there are two copies of the data stored in the flash memory (e.g., duplicate versions), where the physical locations between the first partition 1002 and the second partition 1050 are different. Once the synchronization between the first partition 1002 and the second partition 1050 is complete, the data in the first partition 1002 becomes optional data for retention.

Figure 11:
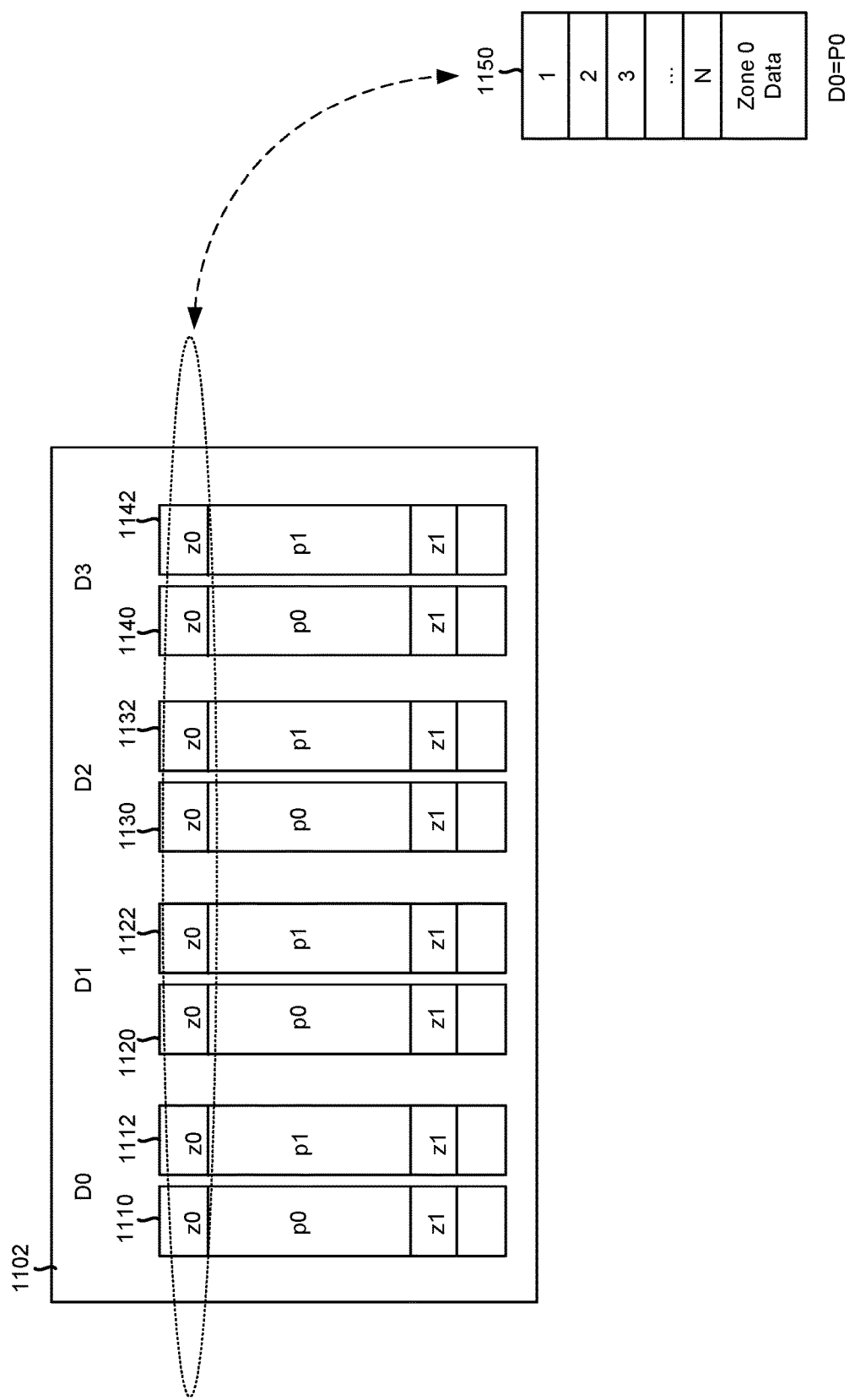
FIG. 11 illustrates an example diagram of a memory read operation at a first partition with multiple die blocks.

FIG. 11 illustrates an example diagram 1100 of a memory read operation at a first partition 1102 with multiple die blocks 1110, 1112, 1120, 1122, 1130, 1132, 1140, 1142. For example, die plane blocks 1110, 1112, 1120, 1122, 1130, 1132, 1140, 1142 may correspond to die plane blocks 910, 912, 920, 922, 930, 932, 940, 942 of FIG. 9. If a read operation is performed on the second partition 1150, the read performance may be lower compared to reading from the first partition 1102 since the reads are performed sequentially (e.g., row by row). To boost the read performance, the data written in the first partition 1102 is maintained as optional references. Instead of reading zone data from a single die block such as the second partition 1150, the data is read from the first partition 1102 to perform faster reads and to achieve maximum parallelism. In this regard, the read operations are performed on the first partition 1102 using parallel reads.

Figure 12:
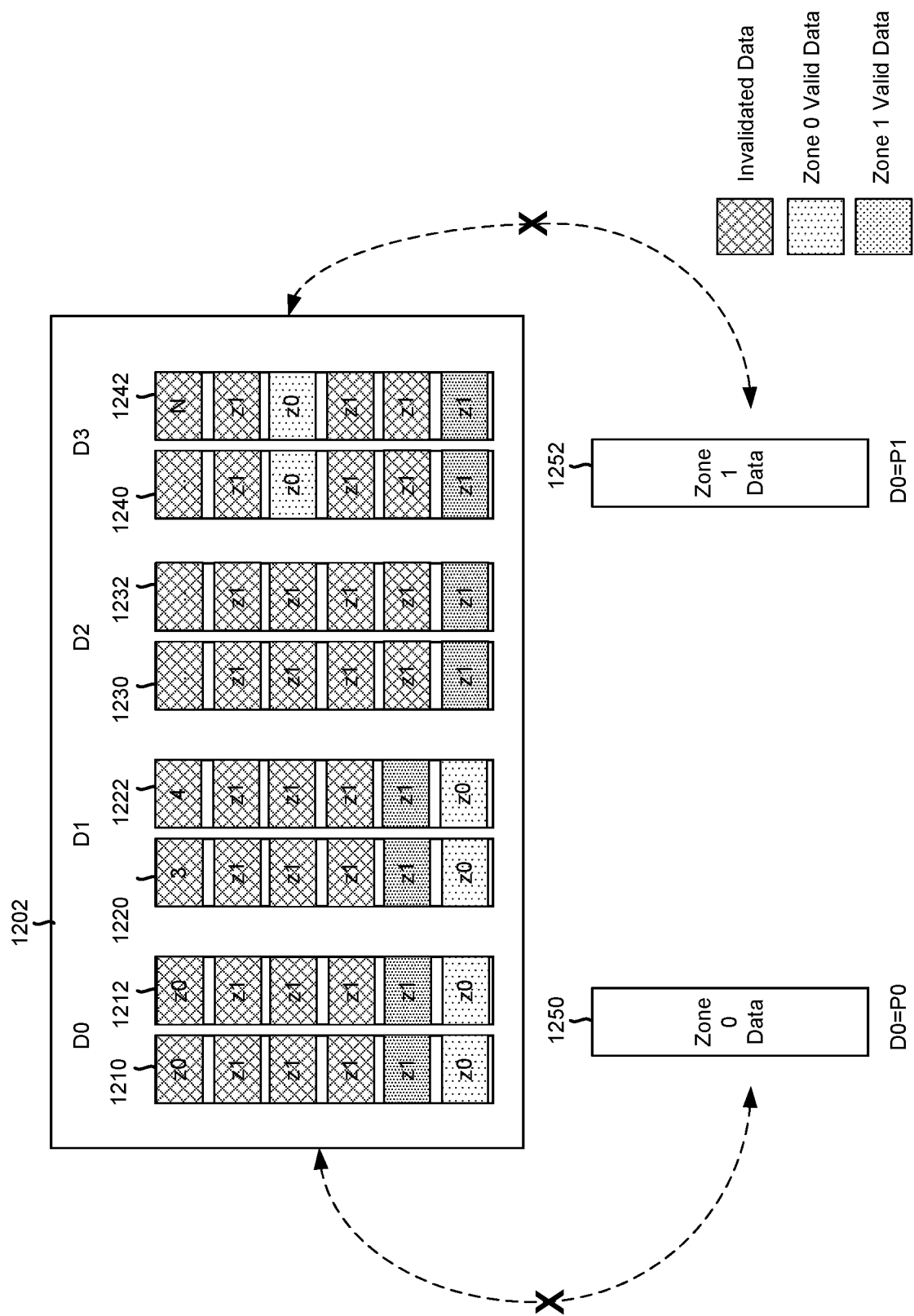
FIG. 12 illustrates an example diagram of a storage device having a first partition containing die plane blocks and second partitions associated with different zones for a read operation.

FIG. 12 illustrates an example diagram 1200 of a storage device having a first partition 1202 containing die plane blocks 1210, 1212, 1220, 1222, 1230, 1232, 1240, 1242 and second partitions 1250, 1252 associated with different zones for a read operation. For example, die plane blocks 1210, 1212, 1220, 1222, 1230, 1232, 1240, 1242 may correspond to die plane blocks 910, 912, 920, 922, 930, 932, 940, 942 of FIG. 9, and second partitions 1250 and 1250 may correspond to second partitions 950 and 950 of FIG. 9.

In some aspects, when the first partition 1202 becomes full, the optional references of the written zone data are erased and the first partition 1202 is erased in its entirety even if valid data is present in the first partition 1202. As illustrated in FIG. 12, each of the die plane blocks 1210, 1212, 1220, 1222, 1230, 1232, 1240, 1242 includes invalidated data, zone 0 valid and zone 1 valid data. By erasing a SLC cache block (e.g., the first partition 1202) in its entirety when the block becomes full, compaction can be reduced or eliminated.

Immediately after erasing the first partition 1202, data can be rewritten into the first partition 1202 using stored data from the second partitions 1250, 1250, depending on the particular zone, in the background (e.g., when the host and storage device are in idle states). In this regard, the zone blocks and optional references can be recreated based on the information within the data written in the corresponding zone blocks of the second partitions 1250, 1252. For example, the zone blocks pertaining to zone 0 in the first partition 1202 can be rewritten with data read from the second partition 1250 associated with zone 0. Similarly, the zone blocks pertaining to zone 1 in the first partition 1202 can be rewritten with data read from the second partition 1252 associated with zone 1.

By using the aforementioned schemes as discussed with reference to FIGS. 8-12, the over-provisioning of very low sized zones can be reduced to a minimum erase unit while the read/write performance with the flash memory can be met by maintaining the optional references of the written zone data in SLC jumbo block. In this regard, no defragmentation or compaction may be performed in the SLC jumbo block.

As the write operations are completed in the SLC jumbo block, the data written into the jumbo block is synchronized with corresponding zone data stored in a separate main partition that is designated for that zone. In this regard, there are two copies of the same data. Eventually, the jumbo block becomes full, and the block will need to be erased. When the SLC jumbo block is erased, the SLC jumbo block can be rewritten using data stored in the main partition for that zone. The copies of the zone data can be regenerated in the background. After the blocks are regenerated in the SLC jumbo block, the storage device can perform faster writes and faster reads.

Figure 13:
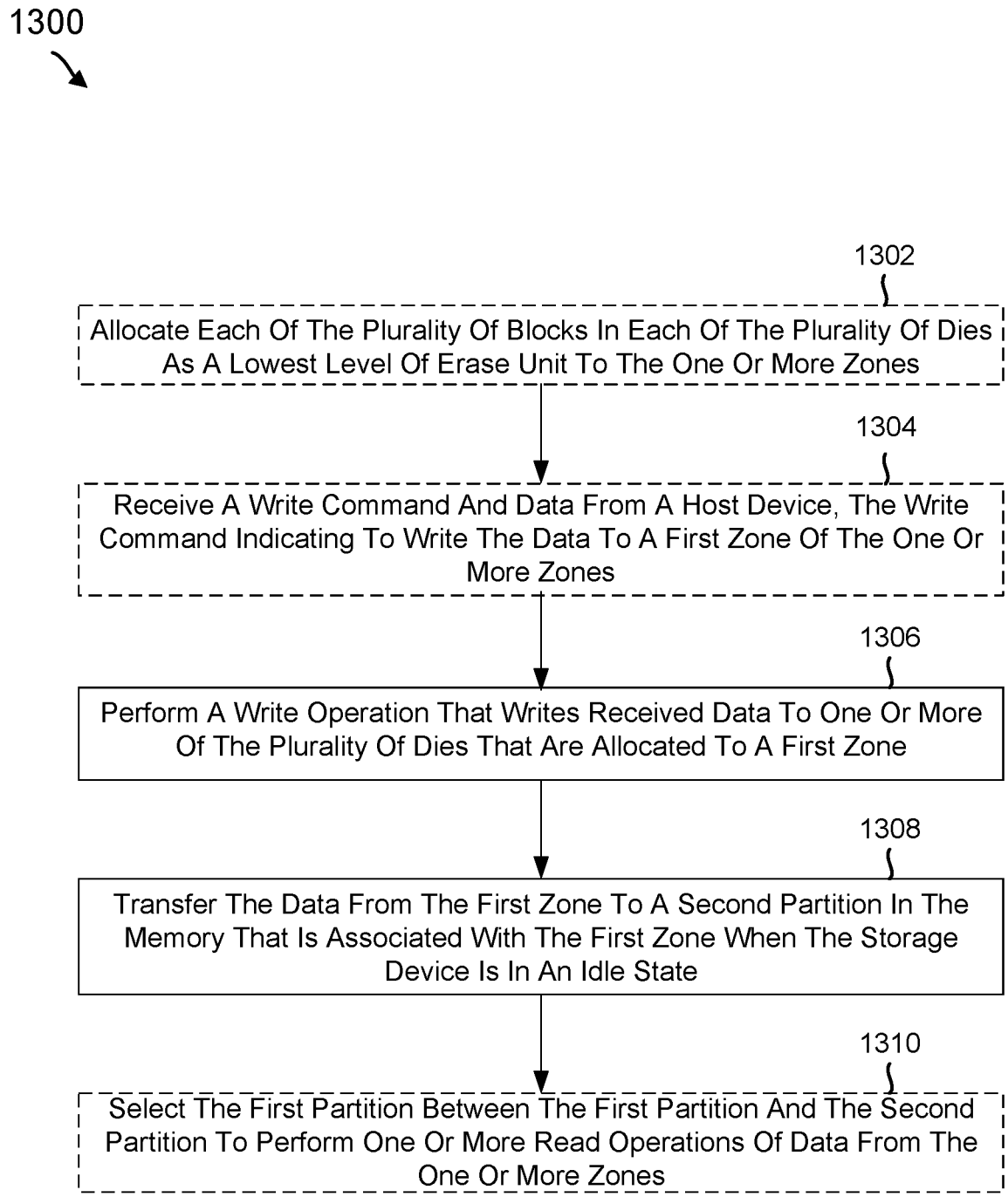
FIG. 13 illustrates an example flow chart of a process of storing data in a block of memory that is allocated to small-sized zones.

FIG. 13 illustrates an example flow chart of a process 1300 of storing data in a block of memory that is allocated to small-sized zones. For example, the process 1300 can be carried out in a storage device 102 such as the one illustrated in FIG. 1. Each of the steps in the flow chart can be controlled using the controller as described below (e.g. controller 123), by a component or module of the controller, or by some other suitable means.

As represented by block 1302, the controller may allocate each of the plurality of blocks in each of the plurality of dies as a lowest level of erase unit to the one or more zones. For example, referring to FIGS. 1, 8 and 9, the controller 123 may a physical block as the lowest level of erase unit to a zone. In another instance, as illustrated in FIG. 6, the controller may allocate a sub-block as the lowest level of erase unit to a zone.

As represented by block 1304, the controller may receive a write command and data from a host device, the write command indicating to write the data to a first zone of the one or more zones. For example, referring to FIGS. 1, 8 and 9, the controller 123 may receive a write command from the host device 104 to perform one or more write operations at specified zones.

As represented by block 1306, the controller may perform a write operation that writes received data to one or more of the plurality of dies that are allocated to a first zone. For instance, referring to FIG. 9, the controller 123 may write data across multiple dies in parallel that are allocated to the first zone.

As represented by block 1308, the controller may transfer the data from the first zone to a second partition in the memory that is associated with the first zone when the storage device is in an idle state. For instance, referring to FIG. 10, the controller 123 may transfer data written to the first zone to the second partition that is designated to store data for the first zone.

As represented by block 1310, the controller may select the first partition between the first partition and the second partition to perform one or more read operations of data from the one or more zones. For instance, referring to FIG. 11, the controller 123 may read data from the first partition by accessing the stored data from multiple dies in parallel as opposed to reading the data sequentially from the second partition.

Figure 14:
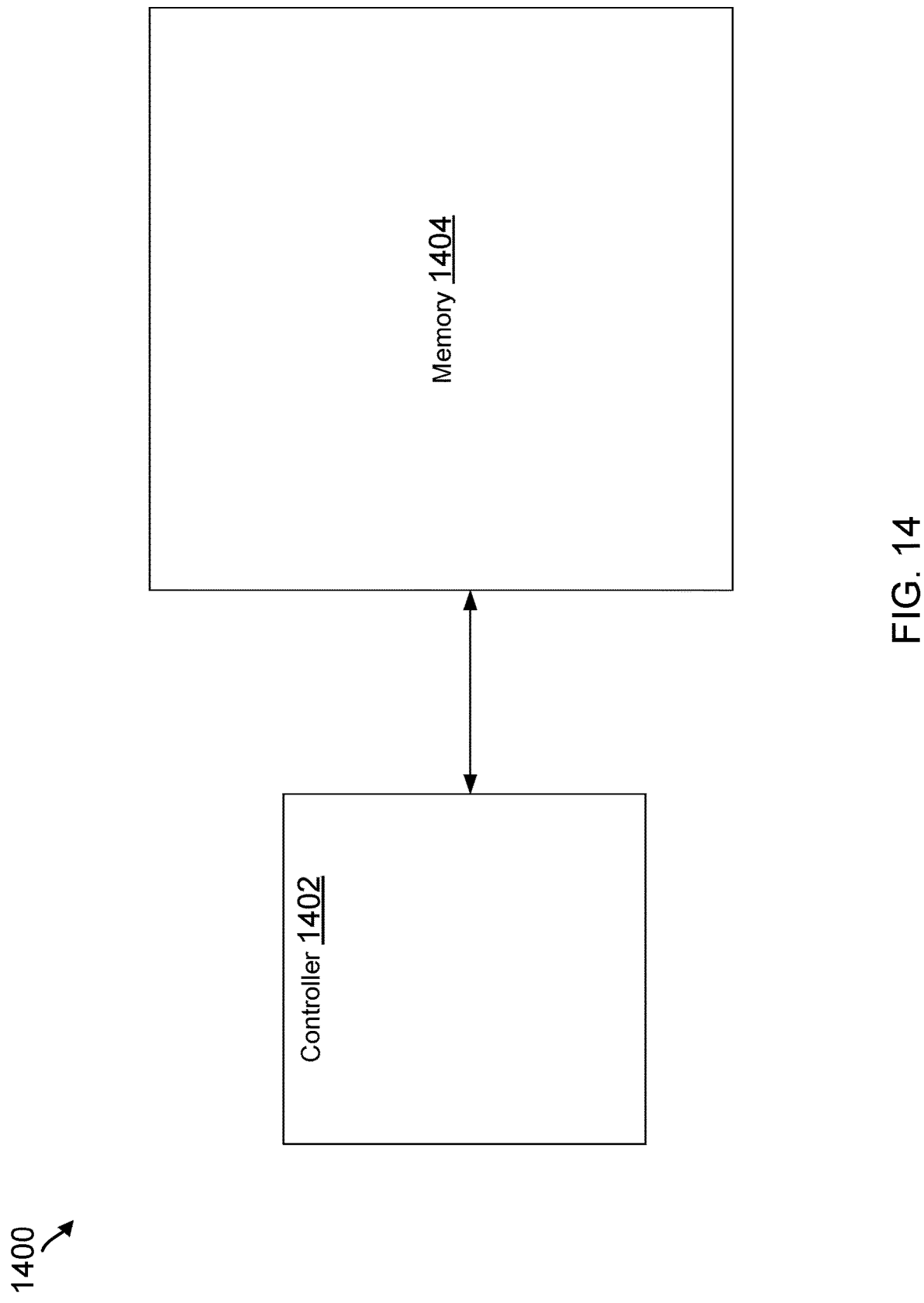
FIG. 14 is a conceptual diagram illustrating an example of a controller coupled to a memory in a storage device.

FIG. 14 is a conceptual diagram illustrating an example 1400 of a controller 1402 coupled to a memory 1404 in a storage device. For example, controller 1402 may correspond to controller 123 and memory 1404 may correspond to the NVM 110 of the storage device 102 in FIG. 1. The controller may be implemented in software, hardware, or a combination of hardware and software. In one exemplary embodiment, the controller is implemented with several software modules executed on one or more processors, but as those skilled in the art will appreciate, the controller may be implemented in different ways. The skilled artisan will readily understand how best to implement the controller based on the particular design parameters of the system.

The controller 1402 provide a means for allocating each of the plurality of blocks in each of the plurality of dies as a lowest level of erase unit to the one or more zones. For example, the controller 1402 may perform the aforementioned process described at 1302. In one configuration, the controller 1402 may be further configured to receive a write command and data from a host device, e.g., as described in connection with 1304. In one configuration, the controller 1402 may be further configured to perform a write operation that writes received data to one or more of the plurality of dies that are allocated to a first zone, e.g., as described in connection with 1306. The controller 1402 provide a means for transferring the data from the first zone to a second partition in the memory that is associated with the first zone when the storage device is in an idle state. For example, the controller 1402 may perform the aforementioned process described at 1308. In one configuration, the controller 1402 may be further configured to select the first partition between the first partition and the second partition to perform one or more read operations of data from the one or more zones, e.g., as described in connection with 1310.

Accordingly, the controller described in the present disclosure improves memory capacity of the storage device by reducing the amount of overprovisioning of memory blocks allocated to small-sized zones. For instance, a storage device provisions a first partition in flash memory having multiple dies as channels that is allocated to very low-sized zones to perform storage operations across all dies in parallel, where each block (or sub-block) in a die is allocated as a lowest level of erase unit for the first partition. In this way, the controller may perform faster writes by accessing multiple dies in parallel to store data intended for different zones while moving the stored data from the faster write zones to a lower write zone in the background. Accordingly, the decrease in overprovisioning of memory block allocation to small-sized zones may be accomplished with minimal changes to controller logic and architecture.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A storage device, comprising:
    a memory (Original) comprising a first partition having a plurality of dies as channels that is allocated to one or more zones; and
    a controller configured to:
        perform a write operation that writes received data to one or more of the plurality of dies that are allocated to a first zone; and
        transfer the data from the first zone to a second partition in the memory that is associated with the first zone, when the storage device is in an idle state.

2. The storage device of claim 1, wherein each of the plurality of dies comprises a plurality of blocks, wherein the controller is further configured to allocate the plurality of blocks in each of the plurality of dies to different zones.

3. The storage device of claim 2, wherein the controller is further configured to allocate each of the plurality of blocks in each of the plurality of dies as a lowest level of erase unit to the one or more zones.

4. The storage device of claim 3, wherein the lowest level of erase unit corresponds to a physical block.

5. The storage device of claim 3, wherein the lowest level of erase unit corresponds to a physical sub-block.

6. The storage device of claim 1, wherein the second partition corresponds to a die plane block having one or more physical blocks.

7. The storage device of claim 1, wherein the first partition and the second partition are located at different physical locations in the memory.

8. The storage device of claim 1, wherein the data that is written to the first partition is synchronized with the second partition using one or more write pointers between the first partition and the second partition.

9. The storage device of claim 1, wherein the data written in the first zone of the first partition is a duplicate version of the data written in the second partition following a synchronization between the first partition and the second partition.

10. The storage device of claim 9, wherein the data written in the first zone of the first partition becomes optional data for retention following the synchronization between the first partition and the second partition.

11. The storage device of claim 1, wherein the controller is further configured to:
    determine whether the first partition is full;
    erase the first partition in its entirety when the first partition is determined to be full; and
    rewriting data to at least a portion of the first partition that corresponds to at least one zone using stored data from the second partition associated with the at least one zone.

12. The storage device of claim 1, wherein the controller is further configured to write data that corresponds to different zones in the first partition, and wherein the first partition is accessible across the plurality of dies to the different zones allocated to the first partition.

13. The storage device of claim 1, wherein the controller is further configured to perform write operations to the first partition with parallelism across all of the plurality of dies for a specified zone.

14. The storage device of claim 1, wherein the controller is further configured to select the first partition between the first partition and the second partition to perform one or more read operations of data from the one or more zones.

15. A storage device, comprising:
    a memory comprising a first partition having a plurality of dies as channels that is allocated to one or more zones; and
    a controller configured to:
        receive a write command and data from a host device, the write command indicating to write the data to a first zone of the one or more zones;
        perform a write operation that writes the data to one or more of the plurality of dies that are allocated to the first zone; and transfer the data from the first zone to a second partition in the memory that is associated with the first zone, when the storage device and the host device are in idle states.

16. The storage device of claim 15, wherein each of the plurality of dies comprises a plurality of blocks, wherein the controller is further configured to allocate the plurality of blocks in each of the plurality of dies to different zones.

17. The storage device of claim 15, wherein the controller is further configured to perform write operations to the first partition with parallelism across all of the plurality of dies for a specified zone.

18. The storage device of claim 15, wherein the data that is written to the first partition is synchronized with the second partition using one or more write pointers between the first partition and the second partition.

19. The storage device of claim 15, wherein the data written in the first zone of the first partition becomes optional data for retention following a synchronization between the first partition and the second partition.

20. A storage device, comprising:
a memory comprising a first partition having a plurality of dies as channels that is allocated to one or more zones, wherein each of the plurality of dies comprises a plurality of blocks; and
a controller configured to:
  allocate each of the plurality of blocks in each of the plurality of dies as a lowest level of erase unit to the one or more zones;
  receive a write command and data from a host device, the write command indicating to write the data to a first zone of the one or more zones;
  perform a write operation that writes the data to one or more of the plurality of dies that are allocated to the first zone; and
  transfer the data from the first zone to a second partition in the memory that is associated with the first zone, when the storage device and the host device are in idle states.

* * * * *